US009272350B2

(12) United States Patent
Sansom et al.

(10) Patent No.: US 9,272,350 B2
(45) Date of Patent: Mar. 1, 2016

(54) METHOD FOR RESISTANCE BRAZE REPAIR

(75) Inventors: David G Sansom, Lake Wyle, SC (US); Gerald J. Bruck, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 675 days.

(21) Appl. No.: 13/561,174

(22) Filed: Jul. 30, 2012

(65) Prior Publication Data
US 2013/0260178 A1 Oct. 3, 2013

Related U.S. Application Data

(60) Provisional application No. 61/618,252, filed on Mar. 30, 2012.

(51) Int. Cl.
*B23K 1/00* (2006.01)
*B23K 1/008* (2006.01)

(52) U.S. Cl.
CPC ............... *B23K 1/0004* (2013.01); *B23K 1/008* (2013.01); *B23K 1/0018* (2013.01); *Y10T 428/12986* (2015.01)

(58) Field of Classification Search
CPC .. B23K 1/0004; B23K 1/0018; B23K 1/0008; B23K 1/008
See application file for complete search history.

(56) References Cited

U.S. PATENT DOCUMENTS

| | | | |
|---|---|---|---|
| 1,592,609 A | 7/1926 | Mattice | |
| 2,629,803 A * | 2/1953 | Bondley | 219/119 |
| 2,796,510 A * | 6/1957 | Herbert, Jr. | B23K 11/0093 219/74 |
| 3,119,632 A | 1/1964 | Skinner | |
| 3,487,530 A | 1/1970 | Ely | |
| 4,010,350 A * | 3/1977 | Cunningham | H05B 3/48 219/463.1 |
| 4,912,295 A | 3/1990 | Arimochi et al. | |
| 4,924,054 A | 5/1990 | Marcie et al. | |
| 5,033,334 A * | 7/1991 | Phaal et al. | 76/107.4 |

(Continued)

FOREIGN PATENT DOCUMENTS

| | | | |
|---|---|---|---|
| CN | 101885095 A | * | 11/2010 |
| DE | 4411680 | | 8/1995 |

(Continued)

OTHER PUBLICATIONS

Machine translation of European Patent document No. 191,300, published Apr. 2015.*

(Continued)

*Primary Examiner* — Geoffrey S Evans

(57) ABSTRACT

Metallic components, including superalloy components such as turbine vanes and blades, are joined or repaired by electric resistance with a high electrical resistivity brazing alloy composition. In some embodiments the brazing alloy comprises filler metal selected from the group consisting of nickel, iron, and cobalt base alloy and elements selected from the group consisting of phosphorous (P), boron (B), silicon (Si), germanium (Ge), sulfur (S), selenium (Se), carbon (C), tellurium (Te) and manganese (Mn). In performing the method of the present invention a high electrical resistivity brazing alloy composition is introduced within a substrate defect or interposed between two substrates that are to be joined. An electric current is passed through the brazing alloy until the alloy melts and bonds to the adjoining substrate. High resistivity of the brazing alloy concentrates heat generated by the current flow in the brazing alloy rather than in the substrate.

9 Claims, 3 Drawing Sheets

(56) References Cited

U.S. PATENT DOCUMENTS

| | | | |
|---|---|---|---|
| 5,479,704 A | 1/1996 | Richter et al. | |
| 5,609,776 A | 3/1997 | Li | |
| 5,961,853 A * | 10/1999 | Thornton | 219/85.14 |
| 6,124,574 A * | 9/2000 | Knepler | A47J 27/21025 |
| | | | 219/447.1 |
| 6,210,635 B1 | 4/2001 | Jackson et al. | |
| 6,213,379 B1 | 4/2001 | Takeshita et al. | |
| 6,327,766 B1 | 12/2001 | Cardente | |
| 6,413,650 B1 | 7/2002 | Dupree et al. | |
| 6,908,288 B2 | 6/2005 | Jackson et al. | |
| 6,994,920 B2 | 2/2006 | Trewiler | |
| 7,156,280 B1 * | 1/2007 | Jiang et al. | 228/56.3 |
| 8,158,903 B2 | 4/2012 | Meier | |
| 8,278,608 B2 * | 10/2012 | Gunther | B29C 45/2737 |
| | | | 219/534 |
| 8,398,374 B2 | 3/2013 | Roberts et al. | |
| 2002/0139794 A1 * | 10/2002 | Budinger | 219/615 |
| 2002/0185198 A1 * | 12/2002 | Pietruska | C22F 1/10 |
| | | | 148/528 |
| 2004/0134887 A1 | 7/2004 | Murphy | |
| 2005/0092717 A1 | 5/2005 | Trewiler | |
| 2007/0034676 A1 | 2/2007 | Zhang et al. | |
| 2007/0067990 A9 * | 3/2007 | Scancarello | B22F 3/225 |
| | | | 29/888.022 |
| 2008/0237306 A1 | 10/2008 | Sathian | |
| 2009/0001134 A1 * | 1/2009 | Kawagoe | B23K 31/12 |
| | | | 228/103 |
| 2009/0026182 A1 * | 1/2009 | Hu et al. | 219/121.64 |
| 2009/0101238 A1 * | 4/2009 | Jossick | B23K 35/3602 |
| | | | 148/23 |
| 2009/0140030 A1 * | 6/2009 | Amancherla et al. | 228/208 |
| 2009/0266870 A1 | 10/2009 | Yousefiani et al. | |
| 2010/0135812 A1 | 6/2010 | Cairo et al. | |
| 2011/0020082 A1 * | 1/2011 | Ozaki | B23K 1/0004 |
| | | | 407/118 |
| 2011/0031223 A1 | 2/2011 | Belanger | |
| 2011/0062219 A1 | 3/2011 | Bezaire et al. | |
| 2011/0168679 A1 | 7/2011 | Qi et al. | |
| 2011/0233293 A1 | 9/2011 | Kral et al. | |
| 2012/0063894 A1 | 3/2012 | Chen et al. | |
| 2012/0205014 A1 | 8/2012 | Bruck et al. | |
| 2013/0020377 A1 * | 1/2013 | Stankowski | B23K 1/0018 |
| | | | 228/119 |
| 2013/0081269 A1 | 4/2013 | Trapp et al. | |
| 2013/0115091 A1 | 5/2013 | Bruck et al. | |
| 2013/0115477 A1 | 5/2013 | Bruck et al. | |
| 2013/0115480 A1 | 5/2013 | Bruck et al. | |
| 2013/0263434 A1 | 10/2013 | Gugel | |
| 2014/0044984 A1 | 2/2014 | Bruck | |

FOREIGN PATENT DOCUMENTS

| | | |
|---|---|---|
| DE | 4447403 | 1/1996 |
| EP | 191300 A1 * | 8/1986 |
| EP | 1527839 | 5/2005 |
| EP | 2369131 | 9/2011 |
| EP | 2492044 | 8/2012 |
| FR | 2619331 | 8/1988 |
| GB | 1368846 | 10/1974 |
| JP | 356021736 A | 2/1981 |
| JP | 62199260 | 9/1987 |

OTHER PUBLICATIONS

Henhoeffer, "Development and Characterization of Braze Repair Technology for Gas Turbine Hot Section Components", May 2008, Master Thesis, Carleton University.*

Machine translation of China Patent document No. CN-101885095-A, Sep. 2015.*

U.S. Appl. No. 13/352,468, filed Jan. 18, 2012, entitled Projection Resistance Welding of Superalloys, (Siemens-142)—Under Final Rejection.

U.S. Appl. No. 13/352,475, filed Jan. 18, 2012, entitled Projection Resistance Brazing of Superalloys, (Siemens-144)—Application Allowed.

U.S. Appl. No. 13/571,754, filed Aug. 10, 2012, entitled Stud Welding Repair of Superalloy Components, (Siemens-158)—Application Allowed.

Translation of DE 4411680 (EP0676259), Jul. 2014.

* cited by examiner

|  | Percent by Weight | | | | | | |
|---|---|---|---|---|---|---|---|
|  | Ag | Cu | Zn | Mn | Ni | Sn | Resistivity (μΩ-cm) |
| Braze 999 | 99.9 |  |  |  |  |  | 1.59 |
| Braze 852 | 85 |  |  | 15 |  |  | 37.5 |
| Braze 450 | 45 | 30 | 25 |  |  |  | 9.08 |
| Braze 495 | 49 | 16 | 23 | 7.5 | 4.5 |  | 30.27 |
| Braze 600 | 60 | 25 | 15 |  |  |  | 8.40 |
| Braze 603 | 60 | 30 |  |  |  | 10 | 24.10 |

METHOD FOR RESISTANCE BRAZE REPAIR

CROSS-REFERENCE TO RELATED APPLICATIONS

This application claims priority to the benefit of and incorporates by reference in their entirety U.S. Provisional Application entitled "Resistance Braze Repair Of Superalloys", filed Mar. 30, 2012 and assigned Ser. No. 61/618,252; as well as co-pending U.S. Utility patent application Ser. No. 13/352,475, entitled "Projection Resistance Brazing Of Superalloys"; and Ser. No. 13/352,468 entitled "Projection Resistance Welding Of Superalloys" both filed on Jan. 18, 2012.

BACKGROUND OF THE DISCLOSURE

1. Field of the Invention

The invention relates to methods for joining or repair of metal components, including advanced superalloy components, by resistance brazing. More particularly, the present invention methods utilize high-resistivity braze fillers that melt with relatively low heat input by application of electric current, without impacting structural properties of the underlying substrate metal. In some embodiments, the invention relates to methods for surface repair of defects in superalloy turbine blades and vanes in steam or gas turbines by filling the defects with a high resistivity braze alloy. Other embodiments relate generally to filling of surface defects in metal substrates or joining of two substrates in fabrication or repair of metal components, especially superalloy metal components, with a high resistivity braze alloy.

2. Description of the Prior Art

Repair or new fabrication of nickel and cobalt based superalloy material that is used to manufacture turbine components, such as cast turbine blades, is challenging, due to the metallurgic properties of the finished blade material. For example a superalloy having more than 6% aggregate aluminum or titanium content, such as CM247 alloy, is more susceptible to strain age cracking when subjected to high-temperature welding than a lower aluminum-titanium content X-750 superalloy. The finished turbine blade alloys are typically strengthened during post casting heat treatments, which render them difficult to perform subsequent structural welding. Currently used welding processes for superalloy fabrication or repair generally involve substantial melting of the substrate adjoining the weld preparation, and complete melting of the welding filler material added. When a blade constructed of such a material is welded with filler of the same or similar alloy, the blade is susceptible to solidification (aka liquation) cracking within and proximate to the weld, and/or strain age (aka reheat) cracking during subsequent heat treatment processes intended to restore the superalloy original strength and other material properties comparable to a new component.

In the past, electric resistance brazing has been commonly used for joining of common ferrous and non-ferrous (e.g., copper) alloy substrate components that are not superalloys. See for example U.S. Pat. No. 4,924,054. Solid sheet, powder or paste brazing alloy is interposed between the components. Resistance brazing is performed by passing current between compressed electrodes into the pair of abutting substrate components and melting the brazing alloy. Electrodes are often constructed of high resistance material such as carbon, tungsten or molybdenum. Most of the heat generated by the current originates in the electrodes, and that heat is in turn conducted through the joined metal substrate components. As electric current is passed between the electrodes and conducts heat through the substrate components the brazing alloy melts and by capillary action wets and affixes the components to each other.

While known electric resistance brazing methods have been utilized for joining common non-ferrous and ferrous alloys, they have shortcomings for application to the joining or repair of superalloy components. Resistance brazing requires high conduction heat input to the substrate in order to melt the brazing alloy. As noted above high heat application to superalloy materials negatively impacts their structural properties. Liquefied braze alloy must not contact the resistance electrodes, or else the electrode material becomes contaminated. If liquefied braze alloy is interposed between an electrode and the substrate material they may become permanently attached, ruining the electrode and possibly damaging the substrate component. Liquified braze overrun contact with electrodes is more likely when repairing surface cracks that are spread over a relatively wide surface area, such as during repair of superalloy turbine blades and vanes.

Methods for joining superalloy components by respectively electric resistance brazing and electric resistance welding are disclosed and claimed in commonly owned co-pending U.S. Utility patent application Ser. No. 13/352,475, entitled "Projection Resistance Brazing Of Superalloys"; and Ser. No. 13/352,468 entitled "Projection Resistance Welding Of Superalloys" both filed on Jan. 18, 2012. More specifically, that co-pending applications disclose methods for joining superalloy components along a contact surface between a mating projection and recess formed in each respective component. The components are compressed and resistance heated along their common contact surface until the brazing material melts (when brazing) or the contact surfaces liquefy or plasticize (when welding), which joins the opposing contact surfaces. In these applications it is disclosed that the resistance heat is concentrated along the mating contact surfaces and does not impact the underlying structural properties of the superalloy components. The applications additionally disclose and claim that a surface defect in a superalloy component can be repaired by excising the surface defect and preparing a superalloy splice having a surface projection profile that conforms to the excised material surface profile. The superalloy splice fills the space formerly occupied by the excised material and is joined to the repaired superalloy substrate by the disclosed resistance brazing or welding method. Thus the repaired superalloy component is effectively reconstructed with a new superalloy splice having the same or similar structural properties as the repaired component. However, for some superalloy repairs where hid structural strength is not necessary, it is preferable to avoid the need to excise defective material and fabricate a complementary filler splice.

Non-structural repair or fabrication of metals, including superalloys, is recognized as replacing damaged material (or joining two components of newly fabricated material) with mismatched alloy material of lesser structural property specifications, where the localized original structural performance of the original substrate material is not needed. For example, non-structural or cosmetic repair may be used in order to restore the repaired component's original profile geometry. In the gas turbine repair field an example of cosmetic repair is for filling surface pits, cracks or other voids on a turbine blade airfoil in order to restore its original aerodynamic profile, where the blade's localized exterior surface is not critical for structural integrity of the entire blade. Cosmetic repair or fabrication is often achieved by using oxidation resistant weld or braze alloys of lower strength than the blade body superalloy substrate, but having higher ductility and lower application temperature that does not negatively impact the superalloy substrate's material properties.

Diffusion brazing has been utilized to join superalloy components for repair or fabrication by interposing brazing alloy between their abutting surfaces to be joined and heating those components in a furnace (often isolated from ambient air under vacuum or within an inert atmosphere) until the brazing alloy liquefies and diffuses within the substrate of the now-conjoined components. Diffusion brazing can also be used to fill surface defects, such as cracks, in superalloy components by inserting brazing alloy into the defect and heating the component in a furnace to liquefy the brazing alloy and thus fill the crack. In some types of repairs a torch, rather than a furnace can be used as a localized heat source to melt the brazing alloy. When performing diffusion or torch brazing repairs of surface defects, unlike known electric resistance brazing methods, any liquefied brazing alloy overruns out of cracks does not cause potential damage to electrodes or inadvertent attachment of electrodes to the repaired substrate.

When performing diffusion or torch brazing on superalloy components care must be taken to avoid overheating the substrate and causing its structural degradation, as discussed above. To this end, brazing alloys with relatively low melting points have been used to minimize heating of the overall superalloy substrate. U.S. Pat. No. 7,156,280 states that nickel- or chromium-based high-temperature braze alloy compositions used to fill wide gaps in superalloy component diffusion brazing repair can include chromium (Cr), hafnium (Hf) and/or boron (B) to suppress the braze alloy's melting point, so as to reduce likelihood of superalloy degradation. It is also known that silicon (Si) and phosphorus (P) also suppress the melting point of nickel alloy brazes. Thus, B, Si and P are constituents in commercially available powdered and solid brazing alloys that are recommended for low melting temperature diffusion and torch brazing applications.

Previously developed superalloy repair methods all have various favorable and less favorable attributes. The electric resistance brazing and welding methods described and claimed in the commonly owned co-pending patent applications, by removal of damaged material and replacement with a splice of new material, provide for high-quality structural repairs with relatively simple repair apparatus and methods, but may not be considered as commercially cost effective for relatively simple cosmetic surface repairs on superalloy components, such as turbine blades and vanes. Generally diffusion brazing processes require relatively long thermal cycling times, complicated metal treatment processes with relatively expensive treatment equipment and relative slow through put times for service repair as compared to known torch or electric resistance brazing techniques. Torch brazing requires significant hand labor that increases costs, slows repair time and introduces the potential for quality control variations dependent upon the skill level of an individual metal worker who is performing the repair. Other commonly known cosmetic repair electric resistance brazing methods are not suitable for repairing relatively wide or extensive cracks due to potential electrode damage and/or inadvertent substrate attachment caused by liquefied brazing alloy overruns out of the cracks.

Thus, a need exists in the art for a method for performing joining of or repairs on surfaces of metallic components, including superalloy components such as turbine vanes and blades, so that subcomponents can be joined or that cracks and other surface defects can be repaired, without degrading structural properties of the component substrate.

Another need exists in the art for a method for performing joining of or repairs on surfaces of metallic components, including superalloy components such as turbine vanes and blades, with proven, repeatable repair techniques and repair equipment that do not require complex welding or post-repair heat treatment procedures that might also degrade structural properties of the component substrate.

Yet another need exists in the art for a method for performing joining of or repairs on surfaces of metallic components, including superalloy components such as turbine vanes and blades, with minimized hand labor and relatively short repair cycle times.

SUMMARY OF THE INVENTION

Accordingly, an object of the present invention is to create a method for performing joining of or repairs on surfaces of metallic components, including superalloy components such as turbine vanes and blades, so that subcomponents can be joined or that cracks and other surface defects can be repaired, without degrading structural properties of the component substrate.

Another object of the present invention is to create a method for performing joining of or repairs on surfaces of metallic components, including superalloy components such as turbine vanes and blades, with proven, repeatable repair techniques and repair equipment that do not require complex welding or post-repair heat treatment procedures that might also degrade structural properties of the component substrate.

Yet another object of the present invention is to create a method for performing joining of or repairs on surfaces of metallic components, including superalloy components such as turbine vanes and blades, with minimized hand labor and relatively short repair cycle times.

These and other objects are achieved by the present invention method for electric resistance brazing of metallic components, including superalloy components such as turbine vanes and blades, with a high electrical resistivity brazing alloy composition. In some embodiments the brazing filler metal, of nickel, iron, or cobalt base alloy also includes ultra-high resistivity elements selected from the group consisting of phosphorous (P), boron (B), silicon (Si), germanium (Ge) (all known to be used to suppress melting point), as well as sulfur (S), selenium (Se), carbon (C), tellurium (Te) and manganese (Mn) (not known to be used to suppress melting point). In performing the method of the present invention a high electrical resistivity brazing alloy composition is introduced within a substrate defect or interposed between two substrates. An electric current is passed through the brazing alloy until the alloy melts and bonds to the adjoining substrate. High resistivity of the brazing alloy concentrates heat generated by the current flow in the brazing alloy rather than in the substrate.

The present invention features a method for resistance brazing of a metallic component by introducing a brazing alloy proximal the component's metallic substrate, where the brazing alloy has a higher electrical resistivity than the substrate. Electric current is then passed through the brazing alloy until the alloy melts and bonds to the substrate.

The present invention also features a method for repairing a superalloy component substrate having a defect therein by introducing a brazing alloy into the defect, where the brazing alloy has a higher electrical resistivity than the substrate. Electric current is passed through the brazing alloy until the alloy melts and fills the defect.

The present invention additionally features a superalloy article of manufacture, such as for example a turbine blade or turbine vane. The superalloy substrate defines a contact surface. A brazing alloy having a higher electrical resistivity than the substrate is bonded to the substrate contact surface by a process of electric resistance brazing. The substrate and braze alloy bonding is performed by introducing the brazing alloy proximal the contact surface and passing electric current through the brazing alloy until the alloy melts and bonds to the substrate.

Exemplary brazing alloys having higher electrical resistivity than superalloy substrates have filler metal, of nickel, iron, or cobalt base alloy, and also include ultra-high resistivity elements selected from the group consisting of phosphorous (P), boron (B), silicon (Si), germanium (Ge) (all known to be used to suppress melting point), as well as sulfur (S), selenium (Se), carbon (C), tellurium (Te) and manganese (Mn) (not known to be used to suppress melting point). In embodiments of the present invention electric current is passed through the brazing alloy with known electric resistance brazing apparatus and electrodes that are attached to the substrate and are conductively coupled to the substrate and the brazing alloy.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in joining and/or repair of metallic substrates, and more particularly repair of superalloy turbine blades and turbine vanes. Brazing alloys having high electrical resistivity are bonded to the substrate by passing electric current generated by a known electric resistance brazing apparatus through the brazing alloy. Heat generated by the flowing electric current is concentrated in the high resistivity brazing alloy rather than in the substrate. The concentrated heat is sufficient to melt the brazing alloy, causing it to bond to the adjoining superalloy substrate material without degrading structural properties of the superalloy.

Figure 1:
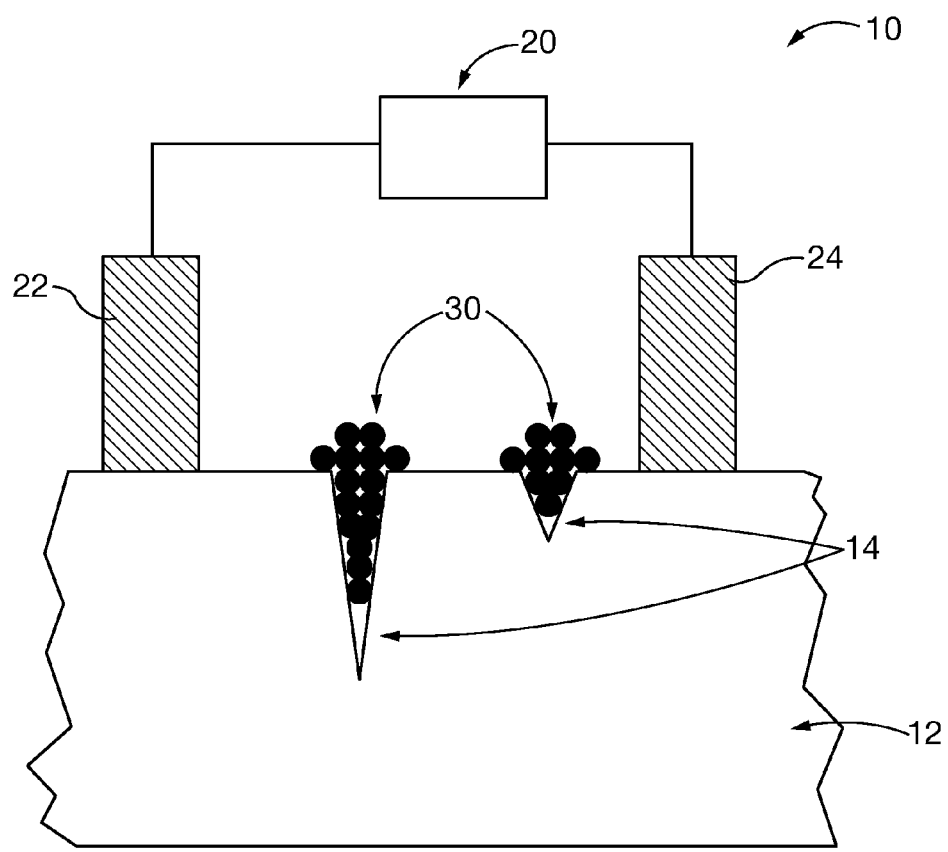
FIG. 1 is a schematic view of an apparatus used to repair a crack in a metal substrate with the resistance brazing methods of the present invention.
Figure 2:
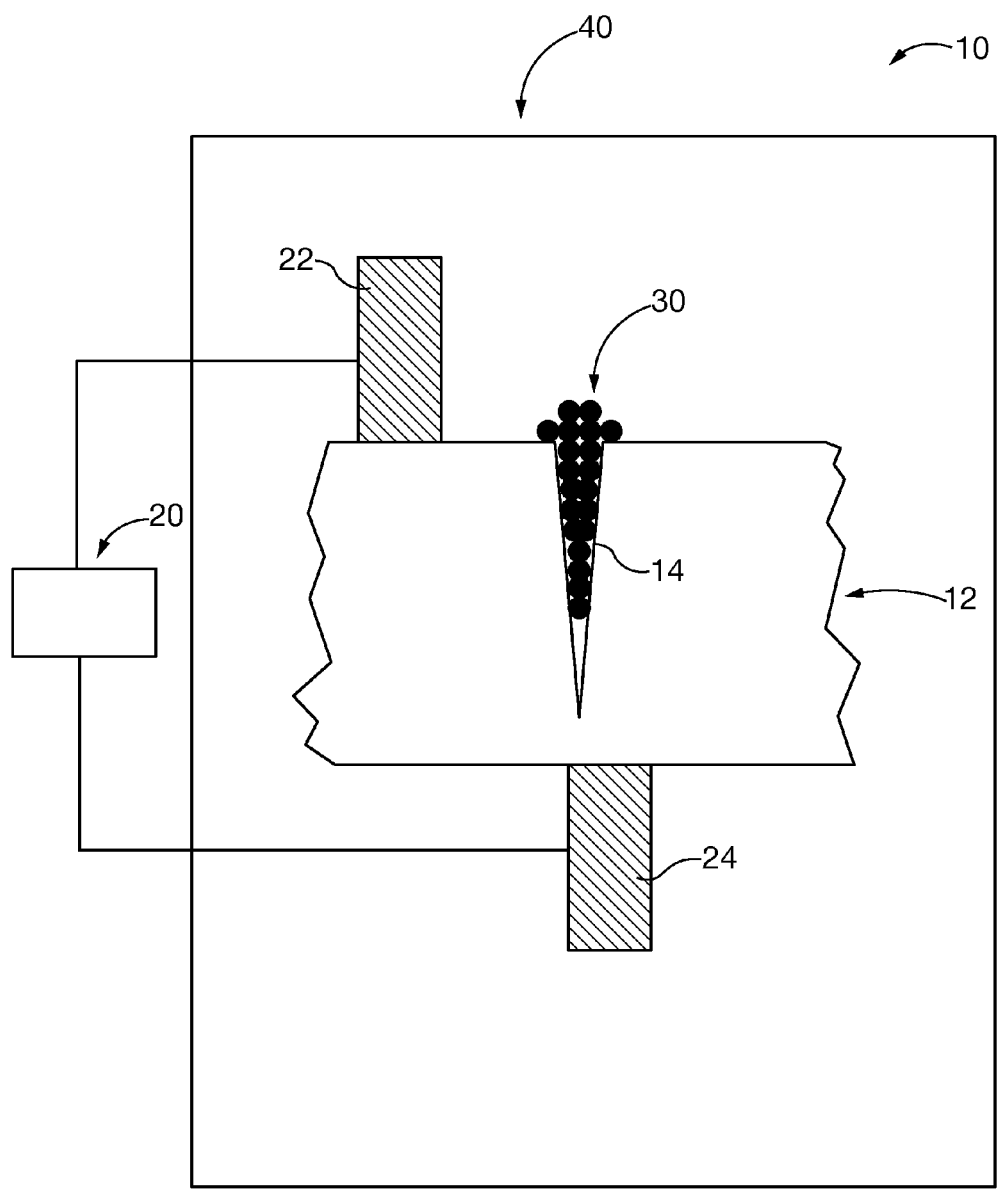
FIG. 2 is a schematic view of an alternative embodiment of the apparatus of FIG. 1.

FIG. 1 shows apparatus 10 for resistance braze repairing an exemplary substrate 12, such as a superalloy turbine blade, having one or more surface crack defects 14. A current generating apparatus 20, for example a known electric resistance brazing apparatus, passes current through known electrodes 22, 24 and the current flow path is completed through the blade substrate 12. In FIG. 1 the electrodes are oriented on the cracked surface face of the blade substrate 12, and laterally flank the cracks 14, so that lateral current flow is directed across all of the cracks and into the brazing alloy 30. The electrode orientation is selectively varied to provide good current flow to the cracks 14. In FIG. 2 the electrodes 22, 24 are oriented on opposite faces of the substrate 12 so that current flow is directed through the substrate thickness, to provide good current flow proximal the relatively deep crack 14. Optionally the entire braze assembly can be contained in a chamber 40 to control atmosphere during brazing.

Figures 3, 4:
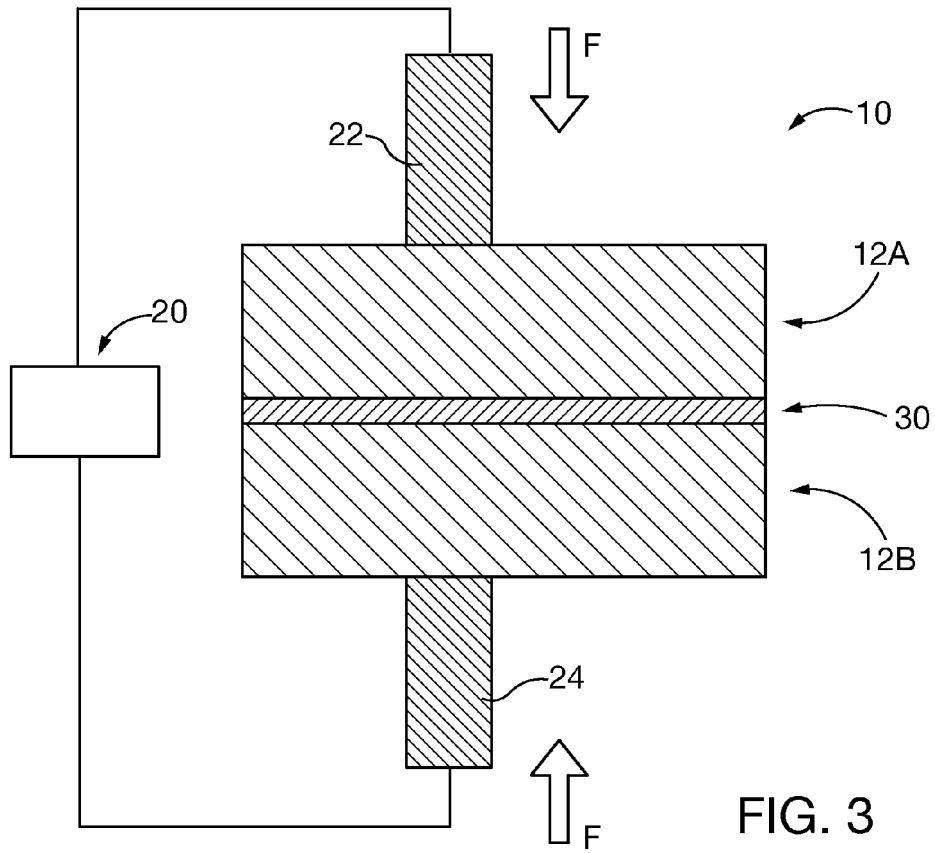
FIG. 3 is a schematic view of the apparatus of FIG. 2 used to join two separate metal substrates.
FIG. 4 is a chart showing electrical resistivity of commercial brazes alloys and their composition percentages by weight of cited constituent materials.

In FIGS. 1 and 2 a high electrical resistivity powdered brazing alloy 30 is introduced into the cracks 14. Powdered brazing alloy is suitable for filling voids, cracks and other surface defects 14 in a substrate 12. However, other types of brazing alloy, for example solid preshaped/preformed ring, foil or ribbon brazing alloy, granular brazing alloy, presintered braze material, or paste brazing alloy may be more suitable for other types of brazing applications. Referring to FIG. 3, substrates 12A and 12B are joined by interposing foil brazing alloy 30 between them under compressive force F. The brazing apparatus 10 of FIG. 3 performs the brazing operation in a furnace or other chamber that is isolated from ambient air under vacuum or within an inert atmosphere.

When the resistance brazing apparatus 20 causes current to flow through the electrically conductive substrate 12 and brazing alloy 30 in any of the embodiments of FIGS. 1-3, the relatively high resistivity brazing alloy 30 generates and concentrates more heat than in the relatively lower resistivity (higher conductivity) substrate. In other words, the brazing alloy 30 heats quicker to a higher temperature than the surrounding substrate 12, so that the substrate is not subject to the thermal degradation risks associated with standard known welding or torch brazing methods. Localized heating at the high resistance braze 30 filled defects or crack discontinuities causes melting of braze alloy, wetting into and along the cracks, and, upon cooling, ultimate repair of the discontinuities. Also by concentrating heating within the crack where the brazing alloy is deposited there is less likelihood of liquefied braze overflow out of the crack that otherwise might run into an electrode and cause electrode contamination damage.

When practicing the brazing methods of the present invention, brazing alloy 30 compositions are selected that have relatively low suppressed melting points to minimize risk of substrates 12 thermal degradation. Logically, substrate thermal degradation risk is lowered if less current flow induced resistance heating is needed to melt the brazing alloy 30. The brazing compositions 30 are also selected for high resistivity properties for efficient heat concentration within braze alloy and subsequent melting, without the need to heat the substrate 12 to higher temperatures that might cause thermal degradation. Brazing filler metal, of nickel, iron, or cobalt base alloy also includes ultra-high resistivity elements selected from the group consisting of phosphorous (P), boron (B), silicon (Si), germanium (Ge) (all known to be used to suppress melting point), as well as sulfur (S), selenium (Se), carbon (C), tellurium (Te), and manganese (Mn) (not known to be used to suppress melting point). Brazing compositions with ultra-high resistivity elements manganese (Mn), tin (Sn), boron (B), silicon (Si) or phosphorous (P) beneficially have both lower melting points and higher resistivity than other brazing alloys—in other words more efficient heat concentration for bonding at lower temperatures than relatively lower resistivity brazing alloys.

Commercially produced braze alloys and fluxes include melting point suppressants that have high electrical resistivity, such as those comprising Si, B, Hf and Cr. Resistivity enhancers include the addition of Mn to silver (Ag) based braze alloys and the addition of Mn and Nickel (Ni) to silver/copper (Ag/Cu) alloys. FIG. 4 shows exemplary commercially available braze alloys with and without resistivity enhancers. For example Braze 999 (almost pure Ag) has a very low resistivity of 1.59 μΩ-cm that is unsuitable for practicing the resistance brazing methods of the present invention. However, Braze 852, a silver braze comprising 15% by weight Mn, has an over twenty-time higher resistivity of 37.5 μΩ-cm. As also shown in FIG. 4, Ag/Cu braze alloys Braze 495 and Braze 603 respectively comprising Mn/Ni and tin (Sn) have over an approximately three-time higher resistivity than counterpart alloys 450 and 600.

Although various embodiments, which incorporate the teachings of the present invention, have been shown and described in detail herein, those skilled in the art can readily devise many other varied embodiments that still incorporate these teachings.

What is claimed is:

1. A method for filling a surface defect within a single metallic component, comprising:
    introducing a brazing alloy proximate a surface defect within a metallic substrate of a single component, the brazing alloy having a higher electrical resistivity and lower melting point than the substrate;
    applying resistance brazing apparatus electrodes to the substrate proximate the surface defect, to couple conductively and direct both electric current path and thermal heating path in the substrate along the surface defect through the brazing alloy;
    passing electric current through the substrate along the surface defect and the higher electrical resistivity brazing alloy, so that the lower melting point braze alloy melts, due to electrical resistance-induced thermal heating, filling and bonding the brazing alloy to the surface defect and the substrate surrounding the surface defect;
    ceasing electric current flow after defect filling, to minimize degrading structural properties of the substrate; and wherein the brazing alloy comprises filler material selected from the group consisting of nickel, iron and cobalt base alloy and elements for increasing braze alloy electrical resistivity, selected from the group consisting of germanium (Ge), sulfur (S), selenium (Se), and tellurium (Te).

2. The method of claim 1, wherein the brazing alloy is selected from the group consisting of a powdered brazing alloy, solid preshaped/preformed ring, foil or ribbon brazing alloy, granular brazing alloy, presintered braze material, and paste brazing alloy.

3. The method of claim 1, wherein the passing electric current is performed with electric resistance brazing apparatus having electrodes that are conductively coupled to the substrate on the same side as, and laterally flanking the defect, so that they are conductively coupled to the substrate and the brazing alloy on opposite sides of the defect, thereby minimizing electric current path through the substrate material below the defect.

4. The method of claim 1, wherein the passing current is performed with electric resistance brazing apparatus having electrodes that are conductively coupled to the substrate, with a first electrode applied to the defect-defining substrate surface and a second electrode applied to an opposed substrate surface below the defect, so that they are conductively coupled to the substrate and the brazing alloy on opposite sides of the substrate, thereby minimizing electric current path laterally through the substrate material on laterally opposed sides of the defect.

5. A method for repairing a superalloy component having a surface defect therein, comprising:
    introducing a brazing alloy into a surface defect within a single superalloy substrate, the brazing alloy having a higher electrical resistivity and lower melting point than the substrate;
    applying resistance brazing apparatus electrodes to the substrate proximate the surface defect, to couple conductively and direct both electric current path and thermal heating path in the substrate along the surface defect through the brazing alloy;
    passing electric current through the substrate along the surface defect and the higher electrical resistivity brazing alloy, so that the lower melting point braze alloy melts, due to electrical resistance-induced thermal heating, filling and bonding the brazing alloy to the surface defect and the substrate surrounding the surface defect;
    ceasing electric flow after defect filling, to minimize degrading structural properties of the substrate; and wherein the brazing alloy comprises filler material selected from the group consisting of nickel, iron and cobalt base alloy and elements that elevate the braze alloy electrical resistivity, selected from the group consisting of germanium (Ge), sulfur (S), selenium (Se), and tellurium (Te).

6. The method of claim 5, wherein the component is a turbine blade or a turbine vane.

7. The method of claim 5, wherein first and second resistance brazing apparatus electrodes are applied to the same side of the defect-defining substrate surface, laterally flanking the defect, so that they are conductively coupled to the substrate and the brazing alloy on opposite sides of the defect, thereby minimizing electric current path through the substrate material below the defect.

8. The method of claim 5, wherein a first resistance brazing apparatus electrode is applied to the defect-defining substrate surface and a second electrode is applied to an opposed substrate surface below the defect, so that they are conductively coupled to the substrate and the brazing alloy on opposite sides of the substrate, thereby minimizing electric current path laterally through the substrate material on laterally opposed sides of the defect.

9. The method of claim 5, wherein the passing electric current is performed in a non-heated chamber that does not have an independent heat source, and that is isolated from ambient air.

* * * * *